(12) United States Patent
Gaikwad et al.

(10) Patent No.: US 10,226,732 B2
(45) Date of Patent: Mar. 12, 2019

(54) DIAGNOSTIC BREATHER DRYER

(71) Applicant: DES-CASE CORPORATION, Goodlettsville, TN (US)

(72) Inventors: Nikhil Rajkumar Gaikwad, Goodlettsville, TN (US); Jonathan Lee Haworth, Hendersonville, TN (US)

(73) Assignee: Des-Case Corporation, Goodlettsville, TN (US)

( * ) Notice: Subject to any disclaimer, the term of this patent is extended or adjusted under 35 U.S.C. 154(b) by 737 days.

(21) Appl. No.: 14/046,600

(22) Filed: Oct. 4, 2013

(65) Prior Publication Data

US 2014/0165827 A1     Jun. 19, 2014

Related U.S. Application Data

(60) Provisional application No. 61/709,360, filed on Oct. 4, 2012.

(51) Int. Cl.
*B01D 53/02* (2006.01)
*B01D 53/04* (2006.01)
*B01D 53/26* (2006.01)

(52) U.S. Cl.
CPC ..... *B01D 53/0454* (2013.01); *B01D 53/0407* (2013.01); *B01D 53/0415* (2013.01); *B01D 53/261* (2013.01); *B01D 2253/102* (2013.01); *B01D 2253/104* (2013.01);
(Continued)

(58) Field of Classification Search
CPC ... B01D 53/261; B01D 53/415; B01D 53/454
See application file for complete search history.

(56) References Cited

U.S. PATENT DOCUMENTS

| 4,231,768 A | 11/1980 | Seibert et al. |
| 4,504,289 A * | 3/1985 | Waller ............... B01D 46/30 55/318 |
| 5,580,451 A | 12/1996 | Tack |

(Continued)

FOREIGN PATENT DOCUMENTS

| JP | 2004008968 A | 1/2004 |
| WO | 2006069360 A2 | 6/2006 |

OTHER PUBLICATIONS

International Search Report by International Application Division, Korean Intellectual Property Office, dated Feb. 13, 2014.
(Continued)

*Primary Examiner* — Christopher P Jones
(74) *Attorney, Agent, or Firm* — Patterson Intellectual Property Law, P.C.; Ryan D. Levy; Grant M. Ford

(57) ABSTRACT

A breather including desiccant for humidity control includes an electronic end of life detection system. A temperature sensor and humidity sensor provide a temperature and humidity of the desiccant to a controller. The controller determines the relative humidity of the desiccant. The controller determines that the desiccant, and thus breather, has reached its end of life (i.e., end of useful life) when the relative humidity reaches a predetermined relative humidity (e.g., 40%). Optionally, a pressure sensor provides a pressure of the reservoir to the controller. The controller determines a fault condition or end of life condition of the breather when the pressure exceeds a predetermined pressure.

5 Claims, 3 Drawing Sheets

(52) U.S. Cl.
    CPC .. *B01D 2253/106* (2013.01); *B01D 2253/116* (2013.01); *B01D 2257/80* (2013.01)

(56) References Cited

U.S. PATENT DOCUMENTS

| | | | |
|---|---|---|---|
| 5,902,381 | A | 5/1999 | Golner |
| 6,558,457 | B1 | 5/2003 | Kolczyk |
| 2001/0025484 | A1* | 10/2001 | Ueno .................... F01N 3/0814 60/277 |
| 2002/0168772 | A1* | 11/2002 | Lloyd .................. G01N 33/007 436/37 |
| 2005/0103195 | A1* | 5/2005 | Golner ............... B01D 53/0415 96/111 |

OTHER PUBLICATIONS

English translation of Japanese Patent No. 2004-8968, 18 pp.
Supplementary European Search Report in corresponding European Patent Application No. EP 13 84 3207 dated Apr. 28, 2016, 9 pp.

* cited by examiner

DIAGNOSTIC BREATHER DRYER

CROSS-REFERENCES TO RELATED APPLICATIONS

The present application claims priority to and hereby incorporates by reference in its entirety U.S. Provisional Patent Application Ser. No. 61/709,360 filed Oct. 4, 2012, entitled "BREATHER DRYER WITH INDICATOR."

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to breathers for liquid reservoirs. More particularly, the present invention relates to humidity controlling breathers for liquid reservoirs.

Breathers allow for expansion of liquids and gases (e.g., air) in liquid (e.g., lubricant) reservoirs while preventing contamination of the liquid. For liquid reservoirs such as engine crank cases and lubricant storage reservoirs, water vapor and dust particles in the air can be pulled into the liquid by the expansion and contraction action of the air and liquid in the reservoir with changes in temperature or barometric pressure of the surrounding environment and the contents of the reservoir (i.e., fluid level changes in the reservoir). Currently, breathers are replaced on a schedule, whether the breathers are at the end of their useful life or not because it is difficult to tell when a breather has reached the end of its useful life. Alternatively, breathers utilize color changing desiccants to indicate when the breather has reached the end of its useful life and needs replacement. The color changing desiccants require transparent breather housings which are generally weaker than opaque breather housings, present chemical incompatibility issues, and the chemicals used to change color may be considered toxic under some guidelines. Further, the color change may be faint, difficult to see depending on the location and environment of the reservoir and breather, and therefore difficult to interpret. For example, breather dryers (e.g., desiccant breathers) are commonly mounted on lubricating fluid reservoirs in large format wind turbines. The nacelles in these turbines are typically cramped and include many poorly lit, hard to reach areas near lubrication reservoirs where breathers are located. Visibility of the breather and any color change is therefore difficult to see. Additionally, the nacelle may typically only be accessed when the wind turbine is shut down (i.e., stopped and not generating power).

BRIEF SUMMARY OF THE INVENTION

Aspects of the present invention provide a breather with desiccant and an electronic end of life detection system. A temperature sensor and humidity sensor provide a temperature and humidity of the desiccant to a controller. The controller determines the relative humidity of the desiccant, and determines that the desiccant, and thus breather, has reached its end of life (i.e., end of useful life) when the relative humidity reaches a predetermined relative humidity (e.g., 40%).

In one aspect, a breather for a reservoir includes a housing, a first opening in the housing, a second opening in the housing, a desiccant, and a humidity sensor. The first opening in the housing is configured to be in fluid communication with air outside the reservoir. The second opening in the housing is configured to be in fluid communication with air inside the reservoir. The desiccant is positioned within the housing such that air passing through the breather from the outside to the inside of the reservoir of the reservoir must pass through the desiccant. The humidity sensor is positioned within the housing. The humidity sensor is operable to provide a humidity signal indicative of the humidity level adjacent the humidity sensor. In one embodiment, the breather further includes a controller electrically connected to the humidity sensor. The controller is operable to determine an end of life condition of the breather as a function of the humidity signal from the humidity sensor.

In another aspect, a method of determining an end of life condition of a breather includes providing a breather operable to attach to a reservoir. The breather includes a housing, a first opening in the housing, a second opening in the housing, a desiccant, and a humidity sensor. The first opening in the housing is configured to be in fluid communication with air outside of the reservoir. The second opening in the housing is configured to be in fluid communication with air inside of the reservoir. The desiccant is positioned within the housing such that air passing through the breather from the outside to the inside of the reservoir must pass through the desiccant. The humidity sensor is positioned within the housing. The emitted sensor provides a humidity signal indicative of a humidity level adjacent the humidity sensor. The humidity signals received at a controller associated with the breather and electrically connected to the humidity sensor. The controller determines the end of life condition as a function of the humidity signal received at the controller.

In another aspect, the breather for a reservoir includes a housing, a first opening in the housing, a second opening in the housing, a desiccant, a first humidity sensor, a second humidity sensor, and a controller. The first opening in the housing is configured to be in fluid communication with air outside of the reservoir. The second opening in the housing is configured to be in fluid communication with air inside of the reservoir. The desiccant is positioned within the housing such that air passing through the breather from the outside to the inside of the reservoir must pass through the desiccant. The first humidity sensor is positioned within the housing and is operable to provide a first humidity signal indicative of a first humidity level adjacent the first humidity sensor. The first humidity sensor is substantially surrounded by the desiccant. The second humidity sensor is positioned within the housing and is operable to provide a second humidity signal indicative of a second humidity level adjacent the second humidity sensor. The second humidity sensor is positioned within the housing such that air passing through the breather from the inside of the reservoir to the desiccant must pass by the second humidity sensor. The controller is electrically connected to the first humidity sensor and the second humidity sensor. The controller is operable to determine an end-of-life condition of the breather as a function of the first humidity signal received from the first humidity sensor and the second humidity signal received from the second humidity sensor.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

Figure 1:
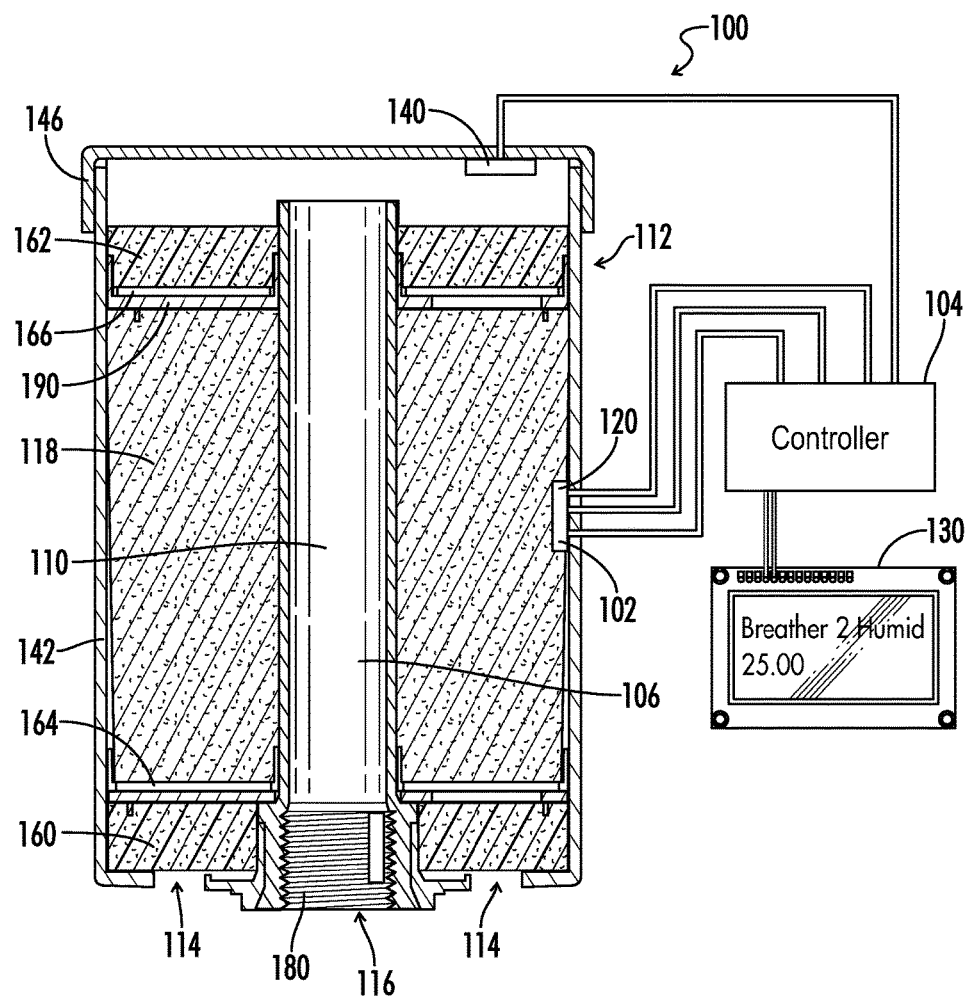
FIG. 1 is a side cutaway view of a breather having a humidity sensor.

Referring to FIG. 1, a breather 100 for a reservoir includes a housing 112, a first opening in the housing 114, a second opening in the housing 116, a desiccant 118, a humidity sensor 102, and a controller 104. The first opening in the housing 114 is configured to be in fluid communication with air outside of the reservoir. The second opening in the housing is configured to be in fluid communication with air inside the reservoir.

The desiccant 118 is positioned within the housing 112 such that air passing through the breather 100 from the outside to the inside of the reservoir must pass through the desiccant 118. Air passing from the outside to the inside of the reservoir may bypass the desiccant 118 or be routed through the desiccant 118.

The humidity sensor 102 is positioned within the housing 112. The humidity sensor 102 is operable to provide a humidity signal indicative of the humidity level adjacent the humidity sensor 102. In one embodiment, the breather 100 further includes a temperature sensor 120 associated with (e.g., positioned in or near) the housing 112. In one embodiment, the humidity sensor 102 is integral with the temperature sensor 120. The temperature sensor 120 is also electrically connected to the controller 104, and the temperature sensor 120 is operable to provide a temperature signal indicative of a temperature adjacent the temperature sensor 120 to the controller 104. In one embodiment, the housing 112 includes an adapter to locate the humidity sensor 102, pressure sensor 140, and/or temperature sensor 120 remote from a main portion of the housing 112.

The controller 104 is electrically connected to the humidity sensor 102. The controller 104 may be local to the housing 112 or remote from the housing 112. The controller 104 may be electrically connected to the humidity sensor 102 via a wired or wireless communications link. The communications link may be analog or digital. The controller 104 is operable to determine an end of life condition of the breather 100 as a function of the humidity signal received from the humidity sensor 102. In one embodiment, the controller 104 is operable to determine the end of life condition as a function of the humidity signal received from the humidity sensor 102 and the temperature sensor received from the temperature sensor 120. The controller 104 uses the temperature signal and the humidity signal to determine a relative humidity associated with the desiccant 118. In actual usage, the relative humidity stabilizes after initial installation of the breather 100 on the reservoir, and the breather 100 reaches the end of its useful life (i.e., end of life) when the relative humidity reaches a predetermined maximum relative humidity. In one embodiment, the relative humidity may stabilize at approximately 20 to 25% and increase generally linearly up to the maximum relative humidity (i.e., the relative humidity indicating end of life or end of useful life of the breather 100) of approximately 40%. In one embodiment, the controller 104 is operable to determine the end of life condition by determining an estimated time of life remaining or an estimated percentage of life remaining as a function of the determined relative humidity and a historical rate of change of the relative humidity calculated by the controller based on previous relative humidity calculations.

In one embodiment, the breather 100 further includes a display 130. The display 130 is electrically connected to the controller 104. The display 130 may be local to the controller 104 or remote from the controller 104. The electrical connection between the display 130 and the controller 104 may be wired or wireless, and may communicate data in an analog or digital format. The controller 104 is operable to provide an end of life signal indicative of the end of life status (i.e., end of life condition) determined by the controller 104. The display 130 is operable to receive the end of life signal from the controller 104 and display to an observer an indication of the end of life status of the breather 100 as a function of the received end of life signal. The end of life signal is indicative of at least one of a relative humidity value, a percentage of life remaining, and an estimated remaining time of life. The end of life status displayed by the display 130 includes the at least one relative humidity value, percentage of life remaining, or estimated remaining time of life indicated by the end of life signal provided by the controller 104.

In one embodiment, the breather 100 further includes a pressure sensor 140. The pressure sensor 140 is positioned within the housing 112 such that air passing through the breather 100 from the inside of the reservoir to the desiccant 118 must pass by the pressure sensor 140. The pressure sensor 140 is operable to provide a pressure signal indicative of an air pressure adjacent the pressure sensor 140 to the controller 104. The controller 104 is further configured to determine a fall condition when the pressure signal indicates that the air pressure adjacent the presser sensor 140 is above a predetermined pressure limit. In operation, when this pressure is above the predetermined limit, it can be inferred that the airflow requirements of the reservoir have not been properly matched to an appropriately sized breather (i.e., a larger capacity breather should be used with the given reservoir), the breather 100 is improperly installed, or has reached particulate or humidity saturation (i.e., end of life or end of useful life) and is no longer effective. In one embodiment, the pressure sensor 140 is a differential pressure sensor comprising a first pressure sensor in fluid communication with the air inside the reservoir and a second pressure sensor in fluid communication with the air outside the reservoir. In this embodiment, when the differential pressure sensed by the pressure sensor 140 exceeds a predetermined limit, the controller 104 is operable to determine the fault condition and communicate the fault condition to the display 130 for display to an observer.

In one embodiment, the housing 112 includes a rigid or semi-rigid body 142 and a cap 146. The breather 100 has a foam bottom 160, a foam top 162, a particulate filter bottom 164, a particulate filter top 166, and a filter ring 190. A space between the foam top 162 and cap 146 defines a breather headspace 170. The foam top 162 is between the desiccant 118 and cap 146. The breather 100 includes a standpipe 110. The standpipe 110 has a standpipe bottom end 106 and a stand standpipe top end 108. The standpipe bottom end 106 includes a threaded section 180 operable to engage corresponding threads of the reservoir. In one embodiment, as shown in FIG. 1, the humidity sensor 102 is substantially surrounded by the desiccant 118. That is, the humidity sensor 102 is located within the desiccant 118. In another embodiment, the humidity sensor 102 is located within the breather cap headspace 170 of the breather 100. In one embodiment, the pressure sensor 140 is also included located within the breather cap headspace 170. In another embodiment, the humidity sensor 102 is located within the standpipe 110. It is contemplated that the humidity sensor 102 may be located within the desiccant 118, partially within desiccant 118 on the second opening 116 side of the desiccant 118 such that air has to flow past the humidity sensor 102 as it passes between the desiccant 118 and the second opening 116, or outside of the desiccant 118 on the second opening 116 side of the desiccant 118 such that air has to flow past the humidity sensor 102 as it passes between the desiccant 118 and the second opening 116. It is contemplated within the scope of the claims that the breather 100 may include any number of first openings 114 and any number of second openings 116. In embodiment, the first opening(s) 114 includes a 2 way, pressure limited check valve. The check valve reduces exposure of the desiccant 118 to the atmosphere to prolong the useful life of the desiccant 118 and thus breather 100. The pressure limit prevents small fluctuations in pressure in the reservoir from drawing air through the desiccant 118 while allowing larger, less transient pressure changes to draw air through the desiccant 118 and maintain the proper pressure in the reservoir (e.g., approximately atmospheric or environmental pressure). In one embodiment, the check valve is limited at 0.2 psi in either direction.

During out-breathing, as moisturized air from the reservoir headspace enters the standpipe bottom side 106 and flows upward in to the breather headspace 170. The air then passes through the foam filter top 162 and particulate filter 166 to remove the dust particles over 3 microns out of the air. The air then passes through the desiccant 118 where moisture gets absorbed or adsorbed from the air.

During in-breathing, breather 100 draws air from the surrounding space in through the first opening 114. This air first comes through the bottom foam filter 160, then the bottom particulate filter 164 where particles over 3 microns are removed. The air then passes through the desiccant 118 where moisture is absorbed or adsorbed by the desiccant 118, and clean, dry air enters in to the top side of standpipe 108, where it can flow into the reservoir headspace.

In one embodiment, the initial installation of the breather 100 on the reservoir includes removing the breather 100 from packaging, attaching the breather 102 threads of the reservoir corresponding to the threaded portion 180 of the standpipe 110, and providing power to the controller 104. Following initial installation, as desiccant 118 absorbs or adsorbs moisture from the reservoir headspace and relative humidity in the reservoir headspace and breather 100 decrease. In one embodiment, the controller 104 is configured to ignore the humidity signal from the humidity sensor 102 until the humidity signal indicates that the humidity level adjacent the humidity sensor 102 has decreased below a predetermined maximum humidity level. In one embodiment, the predetermined maximum humidity level is a relative humidity level, and the controller 104 determines that the humidity level adjacent the humidity sensor 102 has decreased below the predetermined maximum humidity level as a function of both the temperature signal provided by the temperature sensor 120 and the humidity signal provided by the humidity sensor 102. In another embodiment, the controller 104 is configured to ignore the humidity signal for a predetermined period of time after initial installation of the breather 100 on the reservoir to allow the humidity adjacent the humidity sensor 102 to drop below the predetermined maximum humidity level. As continuous in-breathing and out-breathing of the air continues, desiccant 118 gradually reaches its full saturation capacity and will no longer absorb or adsorb the moisture out of the air passing therethrough. This allows moisturized air pass through and flow in and out of the tank headspace if the breather 100 is not replaced.

Figure 2:
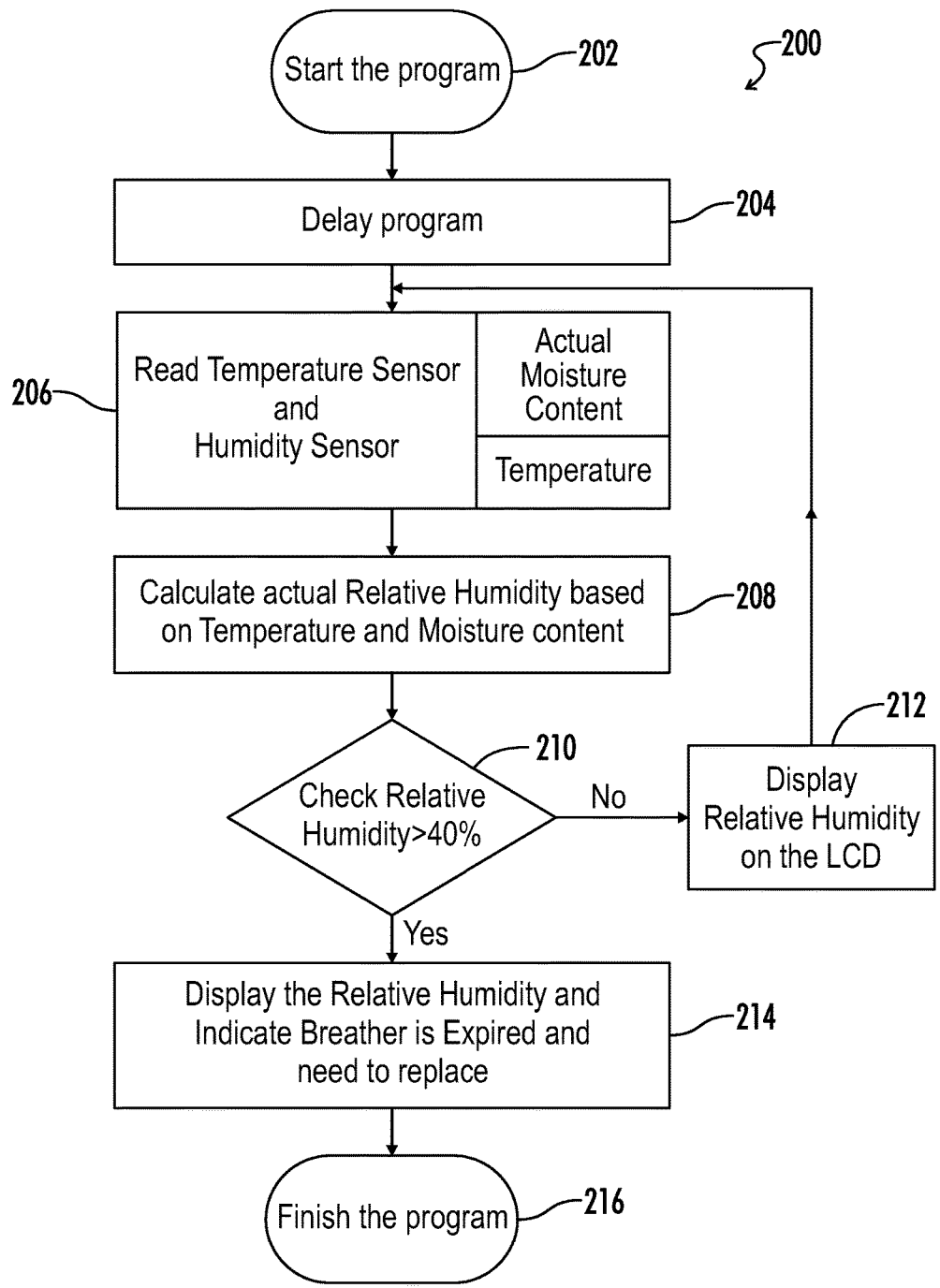
FIG. 2 is a flow chart of a method of determining an end of life condition of a breather.

Referring to FIG. 2, a method 200 of determining an end of life condition of the breather 100 begins at 202 when the controller 104 receives power. At 204, the control delays program as a function of time or a calculator relative humidity as described above to allow the humidity inside the breather 100 to stabilize. In one embodiment, the controller 104 delays the start of the humidity sensor monitoring cycle for a predetermined period of time to allow the humidity in the reservoir and desiccant 118 to stabilize following installation of the breather 100 on the reservoir. It is contemplated within the scope of the claims that the delay may be more or less than 24 hours depending on the intended environment of the breather 100 including the system properties (e.g., volume of reservoir, headspace of reservoir, number of breathers, etc.). At 206, the controller 104 reads the temperature sensor 120 and the humidity sensor 102. At 208, the controller 104 calculates the actual relative humidity in the breather 100 based on the data read from the temperature sensor 120 and the humidity sensor 102. At 210, the controller 104 determines whether the relative humidity is greater than 40%. If the controller determines that the relative humidity is not greater than 40%, then the controller 104 provides the relative humidity to the display 130 (e.g., an LCD display) for display to an observer and again samples the temperature sensor 120 and the humidity sensor 102 at 206. If the controller 104 determines that the relative humidity is greater than 40% at 210, then the controller 104 senses the relative humidity to the display 134 display to an observer at 214. At 214, the controller 104 may also set an alarm or provide additional input to the display 130 indicating that the breather 100 has reached the end of its useful life. The method ends at 216 when the controller 104 ceases to receive power.

It is contemplated that the breather 100 disclosed herein may be used with reservoirs containing lubricating oils, hydraulic fluids, and special chemicals to protect those contents from moisture and particulate ingestion under virtually any condition in any application. It is also contemplated that the desiccant 118 may include Silica Gel (All Varieties); Activated Alumina; Molecular Sieve (All Varieties); Activated Carbon/Charcoal (All Varieties); Alumino Silicate gels: KC-Trockenperlen® N, KC-Trockenperlen® WS; Calcium Sulfate; ZR gel Grain (ZR,TI); Sodium Polyacrylate; Hygroscopic salts/deliquescent salts; and Glycols, or any combination thereof. In one embodiment, electronic components (e.g., the controller 104 and display 130) are encapsulated in moisture impermeable material (e.g., epoxy resin) to avoid particle contamination and premature failure.

Figure 3:
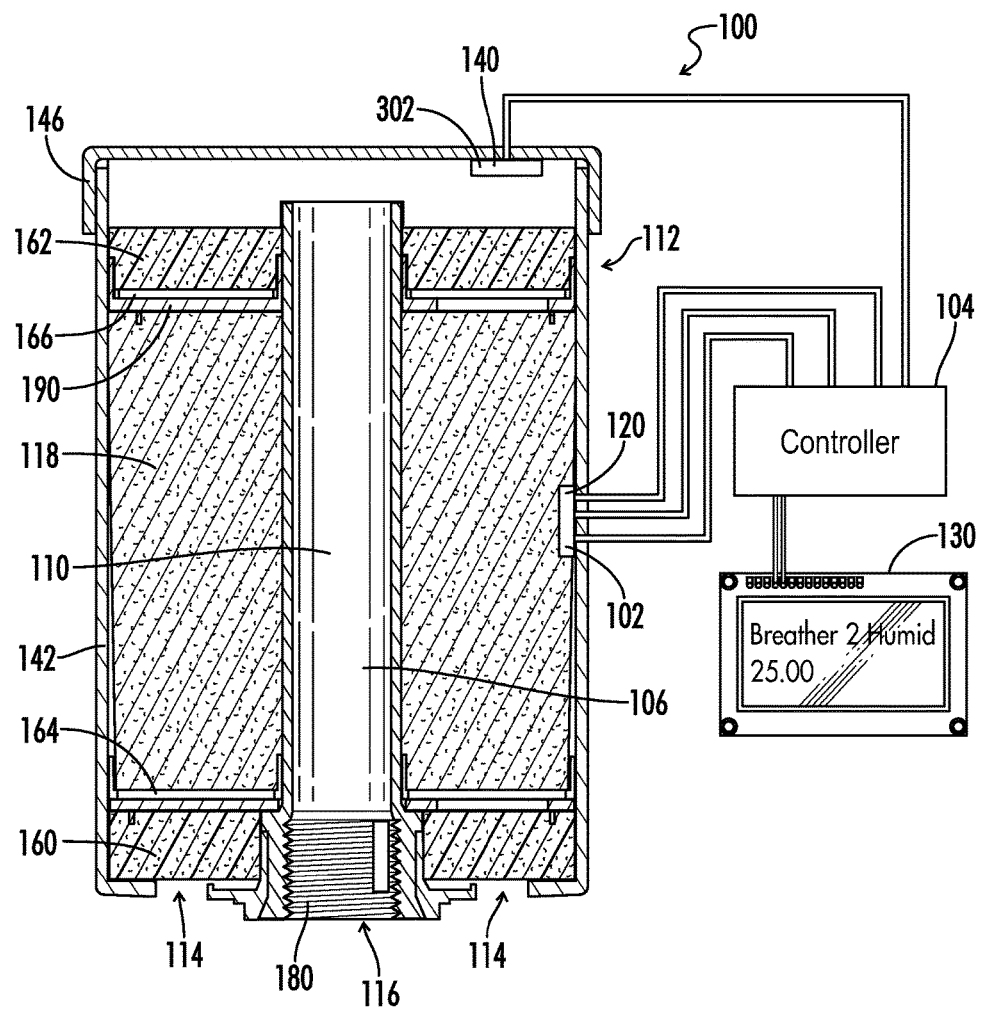
FIG. 3 is a side cutaway view of a breather having dual humidity sensors.

Referring to FIG. 3, in one embodiment, the breather 100 includes dual humidity sensors. The humidity sensor 102 is a first humidity sensor 102 positioned within the housing 112 and substantially surrounded by the desiccant 118. The first humidity sensor 102 is operable to provide a first humidity signal indicative of a first humidity level adjacent the first humidity sensor 102 to the controller 104.

A second humidity sensor 302 may be integral with the pressure sensor 140 and position within the housing 112 such that air passing through the breather 100 from the inside of the reservoir to the desiccant 118 and vice versa must pass by the second humidity sensor 302. The second humidity sensor 302 is operable to provide a second humidity signal indicative of a second humidity level adjacent the second humidity sensor to the controller 104. It is contemplated within the scope of the claims that the second humidity sensor 302 may be located within a thread adapter for adapting the threads of the threaded portion or section 180 of the housing 112 to threads of a corresponding section of the reservoir. In such an embodiment, the housing 112 is considered to include the thread adapter.

The controller 104 is electrically connected to both the first humidity sensor 102 and the second humidity sensor 302. The controller is operable to receive the first humidity signal from the first humidity sensor 102 and the second humidity signal from the second humidity sensor 302. The controller 104 is operable to determine an end of life condition of the breather 100 as a function of the first humidity signal and the second humidity signal. When the first humidity level indicated by the first humidity signal is approximately equal to or greater than the second humidity level indicated by the second humidity signal, the controller 104 operates normally as described above to determine the end of life condition by determining the relative humidity associated with the first humidity sensor 102.

In one embodiment, when the first humidity level indicated by the first humidity signal is less than the second humidity level indicated by the second humidity signal, the controller 104 can determine a fault condition. The first humidity level being less than the second humidity level indicates that the reservoir has not dried completely (i.e., the relative humidity at the second humidity sensor 302 is still trending downward after initial installation of the breather 100 on the reservoir) or that moisture is getting into the reservoir in some way. In one embodiment, the controller 104 differentiates between initial installation and moisture penetration into the reservoir as a function of the rate of decrease of the relative humidity at the second humidity sensor 302 and the time after initial installation (i.e. power up of the controller 104). That is, if the rate of decrease of the relative humidity of the second humidity sensor 302 decreases without a corresponding increase in the humidity at the first humidity sensor 102, then the controller 104 determines that there is water intrusion into the reservoir. In this embodiment, the controller 104 only determines the fault condition when the controller 104 determines that there is water intrusion into the reservoir.

In one embodiment, the determined end of life condition is another fault condition. The controller 104 determines a dewpoint as a function of the pressure signal from the pressure sensor 140 and the temperature signal from the temperature sensor 120. When the second humidity level adjacent the second humidity sensor 302 indicates that the second humidity level is greater than the dewpoint, the controller 104 determines the fault condition. In one embodiment, the controller 104 is operable to transmit fault conditions (i.e., end-of-life conditions) to remote terminals or displays 130.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although embodiments of the present invention have been described in detail, it will be understood by those skilled in the art that various modifications can be made therein without departing from the spirit and scope of the invention as set forth in the appended claims.

A controller, processor, computing device, client computing device or computer, such as described herein, includes at least one or more processors or processing units and a system memory. The controller may also include at least some form of computer readable media. By way of example and not limitation, computer readable media may include computer storage media and communication media. Computer readable storage media may include volatile and nonvolatile, removable and non-removable media implemented in any method or technology that enables storage of information, such as computer readable instructions, data structures, program modules, or other data. Communication media may embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media. As used herein, server is not intended to refer to a single computer or computing device. In implementation, a server will generally include an edge server, a plurality of data servers, a storage database (e.g., a large scale RAID array), and various networking components. It is contemplated that these devices or functions may also be implemented in virtual machines and spread across multiple physical computing devices.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

Thus, although there have been described particular embodiments of the present invention of a new and useful DIAGNOSTIC BREATHER DRYER it is not intended that such references be construed as limitations upon the scope of this invention except as set forth in the following claims.

What is claimed is:

1. A breather for a reservoir, said breather comprising:
a housing;
a first opening in the housing configured to be in fluid communication with air outside of the reservoir;
a second opening in the housing configured to be in fluid communication with air inside of the reservoir;
desiccant positioned within the housing such that air passing through the breather from the outside to the inside or from the inside to the outside of the reservoir must pass through the desiccant;
a humidity sensor positioned within the housing, wherein the humidity sensor is operable to provide a humidity signal indicative of a humidity level adjacent the humidity sensor; and
a controller electrically connected to the humidity sensor, the controller operable to determine an end of life parameter associated with the desiccant at least in part according to the humidity signal, and to (i) obtain a predetermined delay associated with the humidity sensor, (ii) delay start of a humidity sensor monitoring cycle for the predetermined time upon installation, and (iii) ignore the humidity signal after the predetermined delay until the humidity signal indicates that the humidity level adjacent the humidity sensor has reached a predetermined humidity level.

2. The breather of claim 1 wherein the controller is operable to ignore the humidity signal after the initial installation of the breather until the humidity signal indicates that the humidity level adjacent the humidity sensor has reached 20 percent relative humidity.

3. The breather of claim 1 wherein the controller is operable to ignore the humidity signal after the initial installation of the breather until the humidity signal indicates that the humidity level adjacent the humidity sensor has reached 25 percent relative humidity.

4. The breather of claim 1 wherein the controller provides an end of life signal when the humidity signal indicates that the humidity level adjacent the humidity sensor has reached 40 percent relative humidity.

5. The breather of claim 1 further comprising:
receiving an end of life signal from the controller at a display electrically connected to the controller; and
displaying, via the display, to an observer an indication of an end of life status of the breather as a function of the received end of life signal.

\* \* \* \* \*